US009585230B2

(12) United States Patent
Schoofs et al.

(10) Patent No.: US 9,585,230 B2
(45) Date of Patent: Feb. 28, 2017

(54) METHOD OF CONTROLLING A LIGHTING SYSTEM

(75) Inventors: Anthony Robert Andre Schoofs, Dublin (IE); Peter Fuhrmann, Aachen (DE); Marc Aoun, Eindhoven (NL)

(73) Assignee: PHILIPS LIGHTING HOLDING B.V., Eindhoven (NL)

( * ) Notice: Subject to any disclaimer, the term of this patent is extended or adjusted under 35 U.S.C. 154(b) by 752 days.

(21) Appl. No.: 13/203,022

(22) PCT Filed: Feb. 19, 2010

(86) PCT No.: PCT/IB2010/050743
§ 371 (c)(1),
(2), (4) Date: Aug. 24, 2011

(87) PCT Pub. No.: WO2010/097742
PCT Pub. Date: Sep. 2, 2010

(65) Prior Publication Data
US 2011/0305200 A1    Dec. 15, 2011

(30) Foreign Application Priority Data
Feb. 24, 2009 (EP) .................................. 09153492

(51) Int. Cl.
*H05B 37/02* (2006.01)
(52) U.S. Cl.
CPC ..... *H05B 37/0245* (2013.01); *H05B 37/0281* (2013.01); *Y02B 20/42* (2013.01)
(58) Field of Classification Search
None
See application file for complete search history.

(56) References Cited

U.S. PATENT DOCUMENTS

| 7,852,231 B2* | 12/2010 | Fair | ................... | H05B 37/0245 340/10.32 |
| 7,859,398 B2* | 12/2010 | Davidson | ........... | H05B 37/0272 340/286.02 |

(Continued)

FOREIGN PATENT DOCUMENTS

| DE | 3542412 A1 | 6/1987 |
| JP | 2001093675 A | 4/2001 |
| JP | 2005538506 A | 12/2005 |

OTHER PUBLICATIONS

Van Der Stok et al., "A network device for use in a network", PH008406EP1 corresponding to IDs 680065 and 680722, 2007, pp. 1-31.

(Continued)

*Primary Examiner* — Chirag Shah
*Assistant Examiner* — Amar Persaud
(74) *Attorney, Agent, or Firm* — Meenakshy Chakravorty

(57) ABSTRACT

The present invention relates to a method of controlling a lighting system, the lighting system being arranged as a wireless network comprising a controller and a plurality of operating nodes arranged to communicate with each other, wherein the method comprises the steps of synchronizing the operating nodes with the controller, determining, from the plurality of operating nodes, a set of operating nodes that are located within a predetermined operating area, estimating a state-shift delay based on a maximum communication delay between the controller and the set of operating nodes located within the predetermined operating area, communicating the estimated state-shift delay to the plurality of operating nodes, and communicating a state-shift command to the plurality of operating nodes.
An advantage with the invention is that the visual artifact of the state-shift may be essentially removed as the time synchronization and timer interrupt alignment together with (Continued)

the estimated state-shift delay allows for the plurality of nodes to shift state at essentially the same time.

12 Claims, 2 Drawing Sheets

(56) References Cited

U.S. PATENT DOCUMENTS

| | | | |
|---|---|---|---|
| 2005/0238058 A1* | 10/2005 | Peirce, Jr. | H04W 72/1257 370/503 |
| 2006/0154598 A1 | 7/2006 | Rudland et al. | |
| 2007/0057814 A1* | 3/2007 | Goldberg | G01D 4/002 340/870.02 |
| 2007/0183461 A1* | 8/2007 | Eyal | H04B 7/2684 370/503 |
| 2008/0136644 A1* | 6/2008 | McCorkle | G08B 13/2431 340/572.3 |
| 2008/0181172 A1* | 7/2008 | Angelhag | G01S 5/14 370/328 |
| 2008/0304484 A1 | 12/2008 | Wei et al. | |
| 2009/0113229 A1* | 4/2009 | Cataldo et al. | 713/400 |
| 2010/0008351 A1* | 1/2010 | Ashwood-Smith | H04J 3/0661 370/350 |
| 2010/0046586 A1* | 2/2010 | McCorkle | G08B 13/2431 375/140 |
| 2010/0096989 A1* | 4/2010 | Roebke et al. | 315/77 |
| 2011/0305200 A1* | 12/2011 | Schoofs | H05B 37/0245 370/328 |
| 2013/0094845 A1* | 4/2013 | Clark | 396/164 |

OTHER PUBLICATIONS

GreenPeak white paper "It is not about milliamps alone". Please see topic "Low—power Mesh routing". Downloaded from http://www.greenpeak.com/Press/PressKit/20070928%20It's%20not%20about%20milliAmps.pdf.

* cited by examiner

METHOD OF CONTROLLING A LIGHTING SYSTEM

TECHNICAL FIELD

The present invention relates to a method of controlling a lighting system. The invention also relates to a lighting system adapted for performing such a method.

BACKGROUND OF THE INVENTION

Wireless control of lighting systems is increasingly replacing wired control, for example reducing installation costs and commissioning effort. A number of wireless technologies have been developed, including for example IEEE-802.15.4, Low-Power WiFi, WiFi, Bluetooth, EnOcean, Z-Wave and similar technologies, which typically permit short range communication.

For real-time control of a wireless lighting system, it is desired to minimize the latency when switching a state of the light source nodes of the lighting system. An example of such a lighting system is disclosed in US2006/0154598, where a group of light source nodes of a radio network are arranged to selectively respond to broadcast messages from a lighting system controller, thereby providing decreased latency for switching of the light source nodes.

However, in large-scale wireless lighting systems not all light source nodes may be in communication range with the lighting system controller. Rather, large-scale lighting systems require state-shift commands from the controller to the light source nodes to be routed also between the different light source nodes, effectively introducing different control command reception delays for the different light source nodes. Due to the nature of the different reception delays, the visual impression of the state-shift, such as wake-up or switch OFF lights, is unpleasant in that not all light source nodes shift state at the same time. For example, the CSMA/CA mechanism used with 802.15.4 or WiFi to access the wireless channel for transmitting a packet includes a random "backoff time" which will most probably be different on each node, causing some time/delay differences. Besides, collisions, different routes or different nodes with different processing power may cause some different delays.

Therefore, there is a need for an improved method that provides controlled state-shift in a wireless lighting system, having focus on obtaining a simultaneous state-shift of the light nodes.

SUMMARY OF THE INVENTION

In view of the above mentioned need, a general object of the present invention is to provide a method of controlling a state-shift in a lighting system. This and other objects are achieved through a method of controlling a lighting system, wherein the lighting system is arranged as a network comprising a controller and a plurality of operating nodes arranged to communicate with each other. The method comprises the steps of synchronizing the operating nodes with the controller, determining, from the plurality of operating nodes, a set of operating nodes that are located within a predetermined operating area, and estimating a state-shift delay for the set of operating nodes located within the predetermined operating area. The method further comprises the steps of communicating the estimated state-shift delay and a state-shift command to the plurality of operating nodes.

The present invention is based on the understanding that each node in the network for example may be synchronized based on a time synchronization of the plurality of nodes. In summary, said time synchronization provides the plurality of operating nodes with a common notion of time, thereby allowing for task synchronization, such as for example light sources controlled by the operating nodes. Other devices, units, and so on, that are controllable by the operating nodes are of course also possible. That is to say, synchronizing the execution of specific tasks performed by nodes in a network is possible. Time synchronization, i.e. time alignment between two nodes, may for example be achieved by estimating a time offset between two nodes, and providing an estimate of the difference in progress rate between two clock mechanisms belonging to the two nodes, respectively. The difference in counting rate is used to keep a good estimate of the current time of the other node.

An additional step on top of a time synchronization mechanism is the introduction of modifications to the underlying timer counting behavior at the nodes, so as to make sure that the timer counting progress becomes synchronized among different nodes, in the sense that the start/end of timer rounds (where a timer round is a count from a start value to an end value, after which the timer counter is reset to the start value and an interrupt is signaled) occur at the same time on different nodes. In other words, this additional step is made to ensure that timer interrupts occur at the same moment at different nodes. Synchronizing timer interrupts on the operating area is an option to enable a simultaneous state-shift of the light sources, by triggering the command when timers fire. This can for example be achieved by the following method:

The first node takes a snapshot of its own counter, and the second node takes a snapshot of its own counter. The first node sends its snapshot to the second node, enabling the second node to obtain the offset between itself and the first node. By that means a correction may be made so as to enable the two nodes to end their counting loops simultaneously. Note that the introduced modifications are kept track of, so that they can be compensated for during time synchronization (especially when taking time-stamps of the time of a node, where a time-stamp is the value of the local time of a node at a certain moment).

This method, among other methods, for time synchronization and timer interrupt alignment of a plurality of nodes in a network is described in PH008406EP1, which is fully incorporated herein by reference. Other methods of time synchronization and timer interrupt alignment are however also possible. It should however be noted that the step of synchronizing operating nodes with the controller may not be needed each time the method of the present invention is performed, since the operating nodes may stay time-synchronized also during the OFF mode.

The network may for example comprise one controller and a plurality of operating nodes, or alternatively a plurality of controllers and a plurality of operating nodes. The controller may moreover be connected to one or a plurality of nodes.

Accordingly, the predetermined operating area may for example be defined as a physical arbitrary area surrounding the controller, e.g. a single or a plurality of connected or non-connected rooms. The operating area may also be defined by an area covering a plurality of operating nodes being visible to a user of the system. Moreover the set of operating nodes that are located within the predetermined operating area may equal the plurality of operating nodes in the system.

An advantage with the invention is that for example a visual impression of the state-shift (when for example light sources are controlled operating nodes) may be essentially eliminated as the time synchronization and timer interrupt alignment together with the estimated state-shift delay allows the plurality of nodes, or at least the set of nodes within the predetermined operating area, to shift state at essentially the same time. A further advantage with the invention is that the essentially simultaneous state-shift will reduce the sometimes audible effect in such a lighting system. It should be noted that in view of the multiplicity of controllers, the controllers may be synchronized to each other or to already synchronized nodes in the network.

In a preferred embodiment at least one of the operating nodes may be arranged to control a state-shift of at least one light source. Additionally, also a controller may itself control one or multiple light sources.

The state-shift may alternatively be communicated and propagated to the nodes only once, the delay may be hard coded in the nodes, or the delay may even be calculated by the operating node itself. Moreover, different state-shift delays may be communicated to different predetermined operating areas. However, all state-shift delays may be transmitted to all nodes, each individual node being adapted to take its dedicated delay into account.

Moreover, the state-shift delay may be at least one of a state transition time for each operating node (e.g. from OFF to ON), and a maximum communication delay between the controller and the set of operating nodes located within the predetermined operating area. Also, the state-shift command may comprise an operation node-specific variable for creating a predetermined state-shift pattern. This would allow for the introduction of predetermined visual patterns when for example switching ON and OFF the light sources.

It may also be noted that the maximum communication delay may be an estimate that is a sharp deadline, or an estimate that takes operating node density, node population, or node physical deployment into account, the estimate being finally restricted by the state-shift delay of at least one of a state transition time for each operating node, and a maximum communication delay between the controller and the set of operating nodes located within the predetermined operating area.

The network may be wireless, wired or a combination thereof. The wireless network may be a mesh network, required in larger lighting deployments, and the wired network may be a DALI network. In the case of a wireless network, the controller and operating nodes may communicate with each other through one-hop or multi-hop routes, wherein it may be possible to have multiple routes leading from one node to another. The method of the present invention being flexible, the state-shift delay may be estimated to suit the particular network. For instance, the state transition time is of relevance in a wired network, whereas the communication delay, in addition to the state transition time, is of relevance in a wireless network. In a combined network, the operating nodes that are wire-connected to each other and the operating nodes that are wirelessly connected to each other may be provided with different state-shift delays, yet shift state simultaneously.

In a wireless network, the state-shift delay may alternatively be an end-to-end average delay, per-hop average delay, per-hop maximum or minimum delay, etc.

Also, in a wireless network, it may be possible to define the operating area as covering an area within which a plurality of operating nodes may be controlled using a predetermined amount of "communication command hops" from the controller to the operating node, etc.

The state-shift may be a request for "wake up" (e.g. switching ON) or switch OFF of a light source connected to the operation node, wherein the visual effect of light sources waking up or switching OFF may be synchronized. This may be advantageous, since a user of the system may experience a simultaneous wake up, or switch OFF, of all visible light sources, in contrast to the light sources waking up at different times, creating a so-called popcorn effect.

As regards the state-transition time (e.g. wake up time), it may be estimated based on light source types in a lighting system, such as LEDs, fluorescent lamps, etc.

Moreover, the state-shift command may include information as to controlling at least one of beam width, color, beam direction, dimming and intensity of the light source. In this way, the visual effect of the light sources may be adjusted and further synchronized depending on the type of light source. Other examples of state-shifts may be based on for example light curves, light waves, or light shapes.

Furthermore, at least the set of operating nodes located within the predetermined operating area may be adapted to take into account the state-shift delay when executing the state-shift command. The operating nodes outside the predetermined area may hence execute the state-shift command when (or alternatively after) it is received. The visual effect of the state-shift may thereby be improved. For example, each light source within the predetermined operating area, such as a room visible to the user who switches on the lighting system, may wake up with an acceptable delay from the time the user switched on the system, whereas the remote light sources, outside the operating area, wake up in an asynchronous manner not noticeable by the user.

According to another aspect of the present invention, there is provided a lighting system comprising a controller, and a plurality of operating nodes adapted to communicate with the controller. The controller may further be adapted to initiate a synchronization procedure for synchronizing the plurality of operating nodes with the controller, estimate a state-shift delay for a set of operating nodes located within a predetermined operating area, communicate the maximum communication delay to the plurality of operating nodes, and communicate a state-shift command to the plurality of operating nodes.

Moreover, at least one of the operating nodes comprises control circuitry for controlling an electrical connection between a light source and a power supply. Additionally, at least one of the operating nodes comprises means for controlling an illumination property of a light source, such as for example means for controlling the frequency provided by an oscillator for regulating how fast the color of a light source may be changed.

Further features of, and advantages with, the present invention will become apparent when studying the appended claims and the following description. Those skilled in the art will realize that different features of the present invention may be combined to create embodiments other than those described in the following, without departing from the scope of the present invention.

BRIEF DESCRIPTION OF THE DRAWINGS

In the following, embodiments of the present invention will be described in detail, with reference to the accompanying, exemplifying drawings, in which.

DETAILED DESCRIPTION OF PREFERRED EMBODIMENTS

Figure 1:
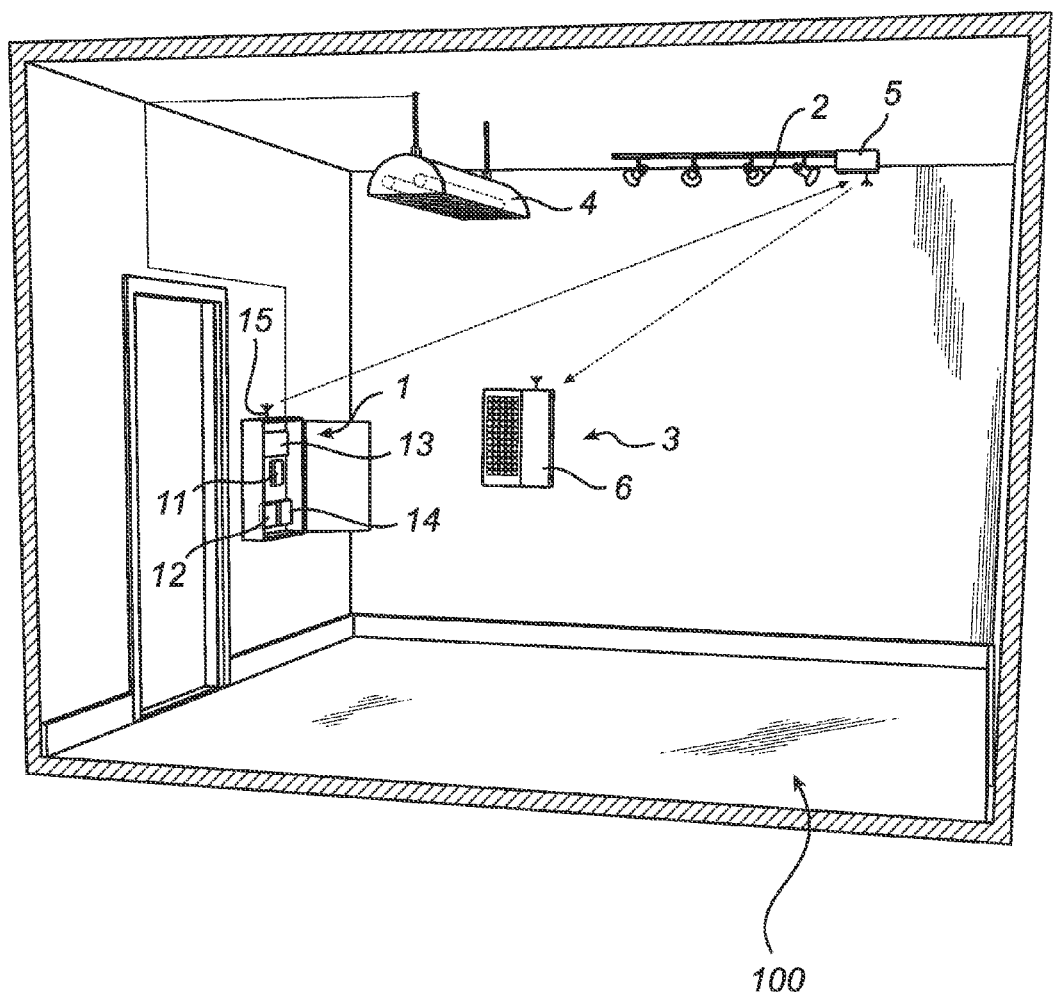
FIG. 1 is a diagram illustrating an example of a lighting system of the present invention.

The present invention will now be described more fully hereinafter with reference to the accompanying drawings, in which currently preferred embodiments of the invention are shown. This invention may, however, be embodied in many different forms and should not be construed as limited to the embodiments set forth herein; rather, these embodiments are provided for thoroughness and completeness, and fully convey the scope of the invention to those skilled in the art. Like reference characters refer to like elements throughout.

Referring now to the drawings and to FIG. 1 in particular, a lighting system 100 is depicted illustrating an exemplifying system in which the method of the present invention may be performed. The lighting system 100 comprises a controller 1 and a plurality of light source nodes 2, 3, 4 coupled together to form a network. For simplicity of explanation, there are only one controller 1 and three operating nodes 2, 3, 4, in the lighting system 100. Here, the controller 1, such as a general switch or a remote control for switching the light source ON and OFF, is connected to the light source nodes 2, 3, 4. In the illustrated example the light source nodes 2, 3, 4 comprise a halogen light source 2, a LED-based lighting unit 3 comprising a group of multiple LEDs, and a fluorescent tube unit 4. Here, the controller 1 is wirelessly connected to the halogen light source 2 and the LED-unit 3, whereas it is connected via wire to the fluorescent tube unit 4. The wired control may be based on the DALI standard, whereas the wireless control may for example be based on IEEE-802.15.4. It should be noted that the controller 1 may be adapted to allow for multiple interfaces based on different communication technologies, thus allowing such a controller 1 to communicate with different lighting nodes that have different communication technologies/interfaces. Also, the controller 1 may be aware of the different types of nodes in the network as well as of the location of the different types of nodes.

The controller 1 may comprise a control circuit 11 that may be programmed to carry out the method of the present invention, and light control functions and a user interface 12 that permit a user to initiate a state-shift of the light source nodes of the lighting system 100 from for example ON and OFF, dimming or the like, as discussed above. The user interface 12 may include user input devices, such as buttons and adjustable controls that produce a signal or voltage to be read by the control circuit 11. The voltage may be a digital signal corresponding to a high and a low digital state. If the voltage is in the form of an analog voltage, an analog to digital converter (A/D) may be used to convert the voltage to a useable digital form. The output from the A/D would then supply the control circuit 11 with a digital signal. The control circuit 11 may include a microprocessor, microcontroller, programmable digital signal processor or another programmable device. The control circuit 11 may also, or instead, include an application-specific integrated circuit, a programmable gate array, a programmable array logic, a programmable logic device, or a digital signal processor. Where the control circuit 11 includes a programmable device such as the microprocessor or microcontroller mentioned above, the processor may further include a computer-executable code that controls the operation of the programmable device.

The controller 1 comprises a transmitter/receiver 13 for communicating, by means of the antenna 15, with the wirelessly connected light source nodes 2, 3. Moreover, the controller 1 comprises a DALI driver 14 for communication with the wired light source node 4. The different light source nodes 2, 3, 4 may typically have different state-shift transition times; for example, a halogen light source and a fluorescent tube have relatively slow start-up times as compared to a LED unit.

In the illustrated example, the halogen light source node 2 comprises a driver 5 external to the actual light source, whereas the driver 6 of the LED unit 3 is integrated. Alternatively, a driving means may be operatively coupled to more than one light source node 2, 3, 4. Various driving and optional control means may be considered herein without departing from the general scope and nature of the present disclosure.

Regarding the communication, there are two communication command hops between the controller 1 and the LED-unit 3, and only one hop between the controller 1 and the halogen light source 2, illustrated by arrows, the communication command hops inducing communication delay. Wired communication however, apart from the individual state-shift transition time of such operating nodes, does not induce a communication delay in a similar manner.

Figure 2:
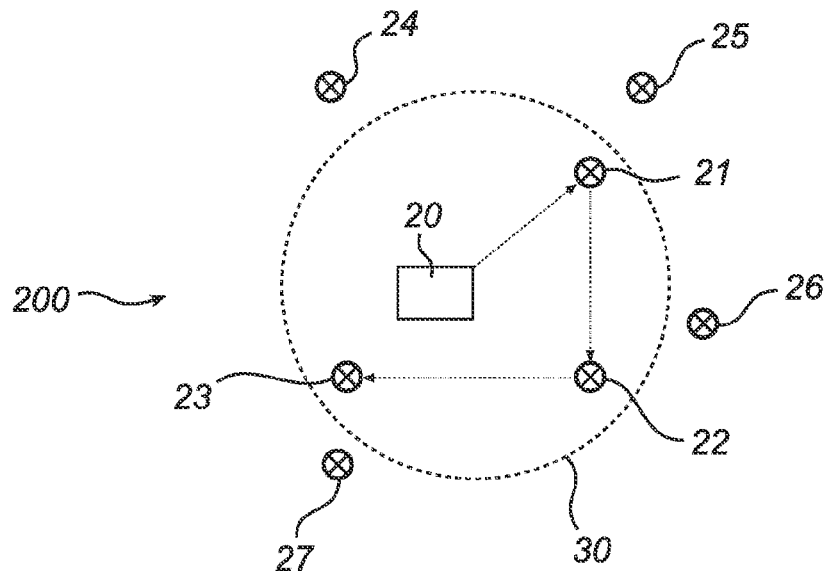
FIG. 2 is a diagram illustrating an example of a lighting system of the present invention.

A different illustration of an exemplary lighting system 200 is provided in FIG. 2. The lighting system 200 comprises a controller 20, such as a light switch for initiating a state-shift of light sources, and a plurality of operating nodes (21-27), here light source nodes wirelessly connected in a wireless network. Here the network is a mesh network, which is required in larger lighting deployments, such as in greenhouses or in industrial automation applications. In the illustrated example, the operating nodes that are within a certain distance from the controller 20 belong to an operating area 30. Here, the operating area 30 is defined by a room, in which the controller 20 is arranged, the operating nodes within the room being visible to a user of the lighting system 200 for example when turning ON or OFF the light or changing any other lighting property as discussed above. Alternatively, the operating area 30 may for example be defined by an acceptable time delay for turning on the light after the user presses the switch of the controller 20, such as after 100-200 milliseconds. In other embodiments, the predetermined operating area 30 may include all available light source nodes 21-27 of the lighting system 200, or alternatively the lighting system 200 may be divided into several operating areas.

In a mesh network, one communication hop between the controller and surrounding light source nodes may for example take about 5 milliseconds, while each additional hop requires for example about 8 milliseconds due to the processing of reception of data packages. Hence, with this estimate, and considering that a gap of about 50 milliseconds between events may not be visible to a user, it may take about 5-6 communication hops before a user notices time differences in state-shift of light source nodes. Taking additional factors into account, the estimate may actually be only 2-3 communication hops before a user notices the popcorn effect when for example turning ON or OFF lights. As an example, in large-scale lighting systems which may comprise several hundreds of light source nodes, the number of communication hops may be much larger than 2-3, and consequently lead to a visually undesirable effect during shifting the state of light sources.

Figure 3:
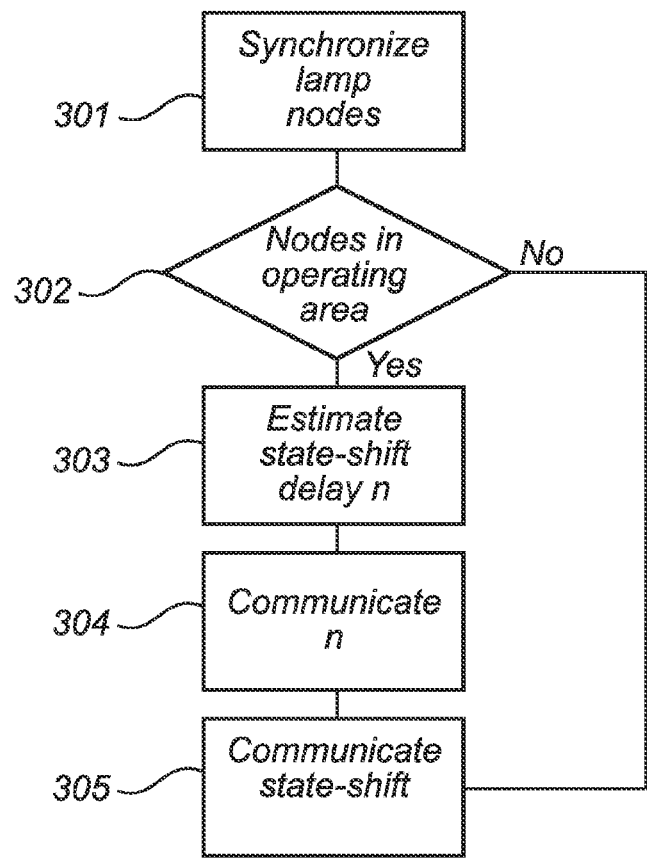
FIG. 3 is a flow chart illustrating an example of the method of the present invention.

For operating the lighting system, FIG. 3 is described in conjunction with FIG. 2, wherein FIG. 3 illustrates the steps of the method of controlling the lighting system 200. Initially, the light source nodes 21-27 are in an OFF state. At time T0, a user flips the light switch, initiating a change of state for the light source nodes from OFF to ON. In a first step 301, the light source nodes are time-synchronized according to a method of time synchronization and timer interrupt alignment. Alternatively, the light source nodes stay synchronized also in the OFF state. The time synchronization and timer interrupt alignment may be maintained independent of the fact that there may or may not be a command to be transmitted, and may also be performed relative to any node in the network, e.g. not only the controller 20.

In step 302, the controller 20 determines whether there are light source nodes within the predetermined operating area 30, hence if there are light source nodes within the room in which the controller 20 is arranged. In the illustrated example, three light source nodes 21-23 are within this area 30. However, if there are no light source nodes within the predetermined operating area, the method proceeds to step 305, in which the state-shift command is communicated to the light source nodes.

Next, in step 303, the controller 20 estimates a state-shift delay for the operating nodes 21-23 located within the operating area 30. Here, the maximum communication delay is based on the number of communication hops between the controller and the light source nodes. The individual state-shift transition time for each light source node is not taken into account, as the light source nodes are of the same type. Here, the delay n is determined by the light source node with the greatest number of communication hops from the controller 20, which is the light source node 23, arranged three communication command hops from the controller 20 in the illustrated example.

In the next step 304, the estimated state-shift delay n is communicated to the light source nodes 21-23 within the predetermined operating area 30, by the controller 20. Alternatively, all light source nodes 21-27 receive the delay n, although only the light source nodes within the predetermined operating area 30 take the delay into account.

In the following step 305, or simultaneous to the step 304 of communicating a state-shift delay n, the state-shift command from OFF to ON is communicated to each of the operating nodes, whereby each of the light source nodes within the predetermined operating 30 area wake up simultaneously after the estimated delay, at T0+n. If the light source nodes are of different types of light sources, an additional delay has been entered into the algorithm, allowing the light sources to turn on in synchrony even though they naturally have different start-up times (e.g. different state-shift transition times). The remote light source nodes 24-27, however, outside the predetermined area 30 wake up when they receive the state-shift command, thus possibly creating a popcorn effect when they do so, which, however, possibly remains unnoticed by the user.

In an alternative embodiment, in which all light source nodes are included in the predetermined operating area, all light sources turn on at T0+n, thus possibly creating the necessity to re-determine n. In another embodiment, in which there are light source nodes in wired connection with the controller within the operating area, these nodes may either receive a command requesting them to shift state at T0+n, or receive the command at T0+n ordering them to immediately shift state, since there is no communication delay using wired control. Yet, the individual state-shift transition time is relevant also for nodes connected via wire.

The person skilled in the art will realize that the present invention is not limited to the preferred embodiments. For example, even though a state-shift from OFF to ON is mainly described, the method may be applied to other state-shifts of a lighting system, such as from ON to OFF, dimming, color change or speed of color change; the individual state-shift transition time may refer to for example full-stop time, and there may be several predetermined operating areas.

Such and other obvious modifications must be considered to be within the scope of the present invention, as it is defined by the appended claims. It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. The word "comprising" does not exclude the presence of elements or steps other than those listed in the claim. The word "a" or "an" preceding an element does not exclude the presence of a plurality of such elements. Further, a single unit may perform the functions of several means recited in the claims. Also, the disclosed method steps may be executed in any different order. Additionally, any operating node may be arranged to assume the role of time master and timer interrupt alignment reference.

The invention claimed is:

1. Method of controlling a lighting system, the lighting system being arranged as a network comprising a controller and a plurality of operating nodes arranged to communicate with each other, wherein the method comprises the steps of:
   synchronizing the operating nodes with the controller comprising the step of synchronizing timer interrupts between a first node comprising a first counter and a second node comprising a second counter of the plurality of operating nodes within a predetermined operating area, wherein:
      the first node takes a first snapshot of the first counter;
      the second node takes a second snapshot of the second counter; and
      the first node transmits the first snapshot to the second node, enabling the second node to obtain a time offset between the first node and the second node;
   determining, from the plurality of operating nodes, a set of operating nodes that are located within the predetermined operating area;
   estimating a state-shift delay for the set of operating nodes, wherein the state-shift delay comprises: (i) a maximum communication delay between the controller and the set of operating nodes, wherein the maximum communication delay is based at least in part on the number of communication hops between the controller and one or more operating nodes within the set of operating nodes; and (ii) the difference in state-shift transition times between each of the operating nodes within the set of operating nodes;
   communicating the estimated state-shift delay to each operating node within said set of operating nodes; and
   communicating a state-shift command to the set of operating nodes.

2. Method according to claim 1, wherein said network is wireless, wired or a combination thereof.

3. Method according to claim 2, wherein the wireless network is a wireless mesh network.

4. Method according to claim 1, wherein at least one of the operating nodes is arranged to control a state-shift of at least one light source.

5. Method according to claim 1, wherein the state-shift command includes information as to controlling at least one of beam width, color, dimming, beam direction, and intensity of the light source.

6. Method according to claim 1, wherein at least the set of operating nodes located within the predetermined operating area are adapted to take into account the state-shift delay during the execution of the state-shift command.

7. Method according to claim 1, wherein the predetermined operating area comprises at least two non-adjacent areas.

8. Method according to claim 1, wherein the state-shift delay and the state-shift command are communicated simultaneously.

9. Method according to claim 1, wherein the state-shift command comprises an operation node-specific variable for creating a predetermined state-shift pattern.

10. Lighting system, comprising:
a controller, and
a plurality of operating nodes adapted to communicate with the controller, wherein the controller is further adapted to:
   initiate a synchronization procedure for synchronizing the plurality of operating nodes with the controller comprising synchronizing timer interrupts between a first node comprising a first counter and a second node comprising a second counter of the plurality of operating nodes within a predetermined operating area, wherein:
      the first node is configured to take a first snapshot of the first counter;
      the second node is configured to a second snapshot of the second counter; and
      the first node is configured to transmit the first snapshot to the second node, enabling the second node to obtain a time offset between the first node and the second node;
   estimate a state-shift delay between the controller and a set of operating nodes located within the predetermined operating area, wherein the state-shift delay comprises: (i) a maximum communication delay between the controller and the set of operating nodes located within the predetermined operating area, wherein the maximum communication delay is based at least in part on the number of communication hops between the controller and one or more operating nodes within the set of operating nodes; and (ii) the difference in state-shift transition times between each of the operating nodes within the set of operating nodes,
   communicate the estimated state-shift delay to each operating node within said set of operating nodes, and
   communicate a state-shift command to the set of operating nodes.

11. Lighting system according to claim 10, wherein at least one of the operating nodes comprises control circuitry for controlling an electrical connection between a light source and a power supply.

12. Lighting system according to claim 10, wherein at least one of the operating nodes comprises means for controlling an illumination property of a light source.

* * * * *